United States Patent
Lin et al.

(10) Patent No.: US 10,425,598 B2
(45) Date of Patent: Sep. 24, 2019

(54) METHODS AND SYSTEMS FOR TIME-ENCODED MULTIPLEXED IMAGING

(71) Applicant: Massachusetts Institute of Technology, Cambridge, MA (US)

(72) Inventors: Joseph Hsuhuan Lin, Lowell, MA (US); Michael Kelly, North Reading, MA (US); Ralph Hamilton Shepard, III, Somerville, MA (US); Brian Tyrrell, Brookline, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/627,775

(22) Filed: Jun. 20, 2017

(65) Prior Publication Data
US 2017/0366763 A1    Dec. 21, 2017

Related U.S. Application Data

(60) Provisional application No. 62/352,267, filed on Jun. 20, 2016.

(51) Int. Cl.
*H04N 5/33* (2006.01)
*G02F 1/133* (2006.01)
(Continued)

(52) U.S. Cl.
CPC ............ *H04N 5/332* (2013.01); *G01J 3/0229* (2013.01); *G02B 26/00* (2013.01); *G02F 1/1335* (2013.01);
(Continued)

(58) Field of Classification Search
CPC ....... H04N 5/332; H04N 7/183; G01J 3/0229; G02B 26/00; G02B 2207/129;
(Continued)

(56) References Cited

U.S. PATENT DOCUMENTS 5,737,075 A     4/1998  Koch et al.
6,631,017 B2 *  10/2003 Khoury .................. G02B 27/46
                                                   359/29
(Continued)

FOREIGN PATENT DOCUMENTS

WO    WO 2013/098708 A2    7/2013

OTHER PUBLICATIONS

Blackburn, J. et al., "Feature aided tracking with hyperspectral imagery," presented at the Optical Engineering & Applications, *Proc. of SPIE*, vol. pp. 66990S-66990S-12 (2007).
(Continued)

*Primary Examiner* — Michael Lee
(74) *Attorney, Agent, or Firm* — Smith Baluch LLP

(57) ABSTRACT

An imaging system uses a dynamically varying coded mask, such as a spatial light modulator (SLM), to time-encode multiple degrees of freedom of a light field in parallel and a detector and processor to decode the encoded information. The encoded information may be decoded at the pixel level (e.g., with independently modulated counters in each pixel), on a read-out integrated circuit coupled to the detector, or on a circuit external to the detector. For example, the SLM, detector, and processor may create modulation sequences representing a system of linear equations where the variables represent a degree of freedom of the light field that is being sensed. If the number of equations and variables form a fully determined or overdetermined system of linear equations, the system of linear equations' solution can be determined through a matrix inverse. Otherwise, a solution can be determined with compressed sensing reconstruction techniques with the constraint that the signal is sparse in the frequency domain.

24 Claims, 18 Drawing Sheets

(51) Int. Cl.
  *G02F 1/1335* (2006.01)
  *H04N 7/18* (2006.01)
  *G02B 26/00* (2006.01)
  *G01J 3/02* (2006.01)

(52) U.S. Cl.
  CPC .... *G02F 1/13318* (2013.01); *G02F 1/133526* (2013.01); *G02F 1/133528* (2013.01); *H04N 7/183* (2013.01); *G02B 2207/129* (2013.01); *G02F 2203/12* (2013.01)

(58) Field of Classification Search
  CPC ............... G02F 1/13318; G02F 1/1335; G02F 1/133526; G02F 1/133528; G02F 2203/12
  USPC ........................................................ 348/144
  See application file for complete search history.

(56) References Cited

U.S. PATENT DOCUMENTS

| | | | |
|---|---|---|---|
| 8,179,296 B2 | 5/2012 | Kelly et al. | |
| 8,605,853 B2 | 12/2013 | Schultz et al. | |
| 8,692,176 B2 | 4/2014 | Kelly et al. | |
| 8,933,832 B2 | 1/2015 | Kelly et al. | |
| 9,159,446 B2 | 10/2015 | Schultz et al. | |
| 9,270,895 B2 | 2/2016 | Kelly et al. | |
| 9,385,738 B2 | 7/2016 | Kelly et al. | |
| 9,491,389 B2 | 11/2016 | Kelly et al. | |
| 9,615,038 B2 | 4/2017 | Kelly et al. | |
| 9,712,771 B2 | 7/2017 | Kelly et al. | |
| 9,743,024 B2 | 8/2017 | Tyrrell et al. | |
| 9,768,785 B2 | 9/2017 | Schultz et al. | |
| 9,883,798 B2 * | 2/2018 | Bedard | A61B 3/12 |
| 2005/0058352 A1 | 3/2005 | Deliwala | |
| 2005/0270528 A1 | 12/2005 | Geshwind et al. | |
| 2006/0017924 A1 * | 1/2006 | Kowarz | G01J 3/2823 356/330 |
| 2007/0026327 A1 * | 2/2007 | Lim | G03G 5/0542 430/58.4 |
| 2007/0146700 A1 * | 6/2007 | Kowarz | G01J 3/02 356/310 |
| 2010/0309467 A1 * | 12/2010 | Fox | G01J 3/02 356/326 |
| 2015/0116563 A1 * | 4/2015 | Herman | H03M 7/3062 348/302 |

OTHER PUBLICATIONS

Schultz, K. et al., "Digital-pixel focal plane array technology," *Lincoln Laboratory Journal*, vol. 20, No. 2, pp. 36-51 (2014).
International Search Report and Written Opinion dated May 4, 2018 for International Application No. PCT/US17/38235, 16 pages.

* cited by examiner

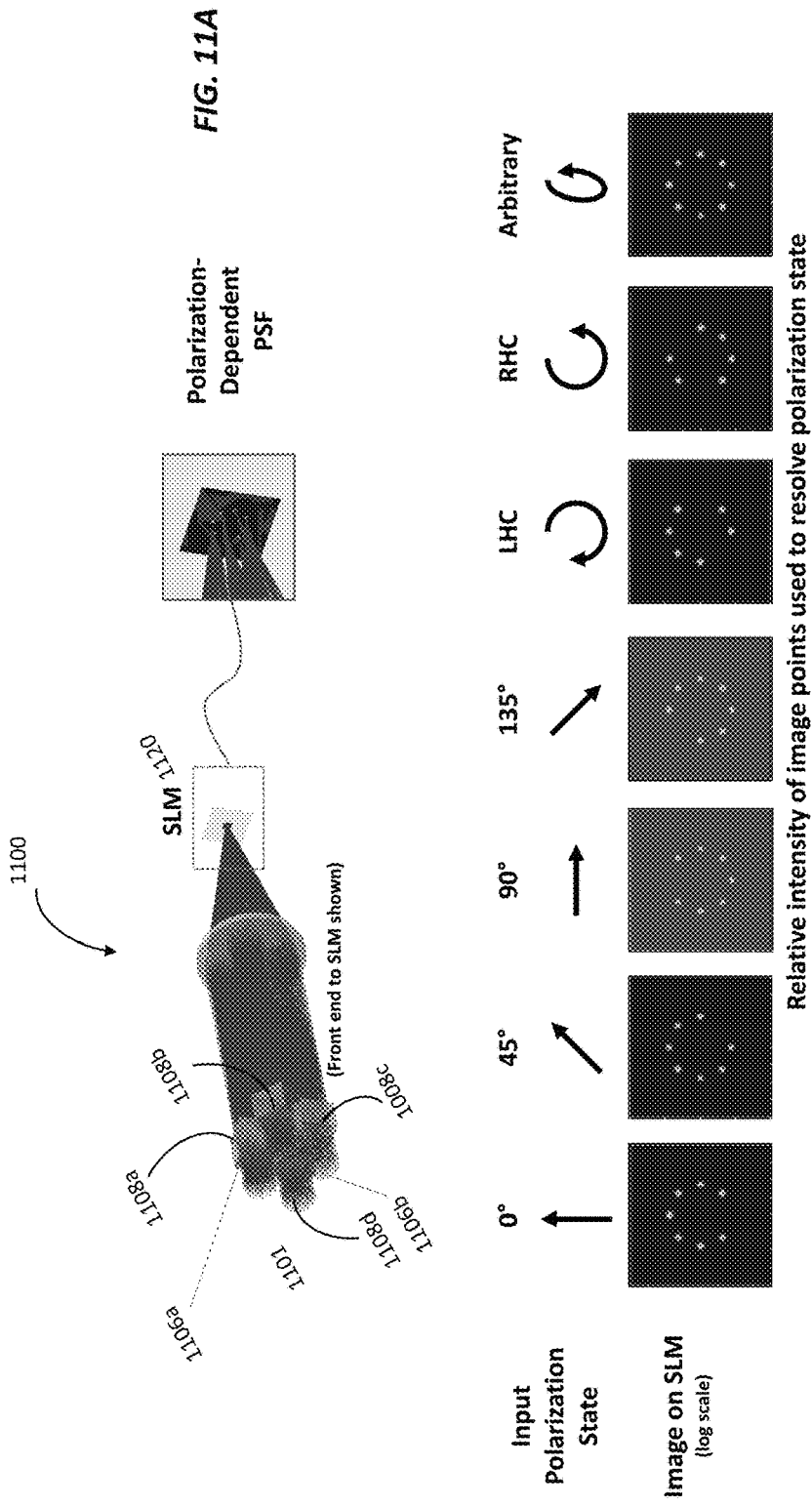

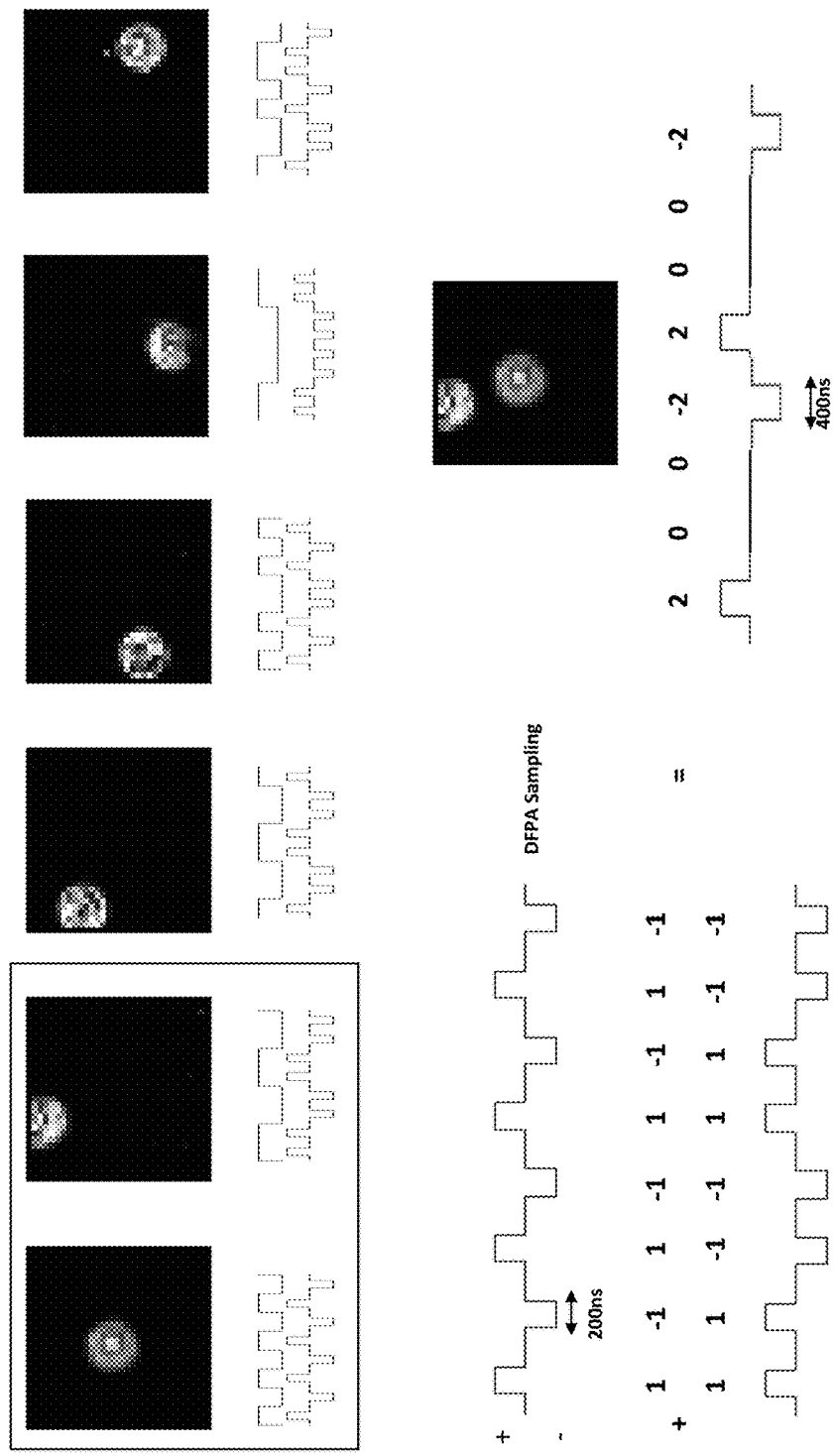

METHODS AND SYSTEMS FOR TIME-ENCODED MULTIPLEXED IMAGING

CROSS-REFERENCE TO RELATED APPLICATION(S)

This application claims the priority benefit of U.S. Application No. 62/352,267, which was filed on Jun. 20, 2016, and is incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

Wide-area motion imaging (WAMI) has received increased attention for defense and commercial applications due to the importance of wide-area persistent surveillance for homeland protection, battlefield situational awareness, environmental monitoring, and intelligence, surveillance, and reconnaissance of denied areas. Recently developed systems, such as Argus-IS, can surveil up to 100 km$^2$ at over a gigapixel resolution from an airborne platform. This huge amount of visual data requires algorithms for automated detection and tracking of targets of interest. However, traditional kinematic data based tracking algorithms have challenges in wide area motion imagery due to a relatively low sampling rate, low spatial resolution, occlusions, changes in lighting, and multiple confusers. Incorporating hyperspectral data can boost the probability of detection, reduce false alarms, and improve performance in vehicle tracking and dismount detection.

Currently fielded imaging spectrometers use either dispersive or interferometric techniques. A dispersive spectrometer uses a grating or prism to disperse the spectrum along one axis of a focal plane array (FPA) while the other axis is used to measure a single spatial dimension. An interferometric spectrometer reconstructs the spectrum from an interferogram measured at the FPA by splitting the incident light into two optical paths and varying the optical path distance of one of the paths with a moveable mirror.

Neither dispersive spectrometers nor interferometric spectrometers are suitable for motion imaging a large area on the ground. For example, to cover 64 km$^2$ at a ground sampling distance of 0.5 m, an update rate of 1 Hz, and up to 256 spectral bands, a dispersive grating spectrometer must sacrifice signal-to-noise ratio (SNR) (<4 µs dwell time per pixel). An interferometric spectrometer is not even capable of imaging at a 1 Hz update rate as its mirror would have to move more than an order of magnitude faster (65,000 steps/sec) than what is typically available (2000 steps/sec). Given these constraints, it is not surprising that no military or commercial WAMI platform has a hyperspectral sensing capability. Therefore, today's systems can offer large area coverage or wide spectral bandwidth, but not both.

SUMMARY

Time-encoded multiplexed imaging has the potential to enable wide area hyperspectral motion imaging as it has greater throughput than a dispersive imager and a faster scan rate than an interferometric imager. It can be implemented with an imaging system that includes a first lens, a spatial light modulator (SLM), a second lens, and a detector array.

In operation, the first lens images a first point in an object plane to a first point in a first focal plane and images a second point in the object plane to a second point in the first plane. The SLM, which is disposed in the first plane, encodes the first point in the first plane with a first temporal modulation and encodes the second point in the first plane with a second temporal modulation different from the first temporal modulation. The second lens, which is in optical communication with the SLM, images the first point in the first plane to a first point in a second plane and the second point in the first plane to a second point in the second plane. And the detector array, which is disposed in the second plane, includes a first detector element positioned to sense both the first temporal modulation and the second temporal modulation.

Another example imaging system includes an SLM, an optical element in optical communication with the SLM, a detector array, and a processor operably coupled to the detector array. The SLM temporally encodes different portions of a light field with respective temporal modulations that are based on a Hadamard matrix. The optical element spatially combines the different portions of the light field at a first plane, where the detector array detects the light field at a spatial resolution lower than a spatial resolution of the SLM. The processor samples an output of the detector array at a rate based on the respective temporal modulations.

Yet another example imaging system includes an SLM, a focal plane array in optical communication with the SLM, and a processor operably coupled to the focal plane array. The SLM applies temporal encoding sequences to multiple image features in parallel. The focal plane array samples the temporal encoding sequences. And the processor produces, based on the temporal encoding sequences, a super-resolution image, a hyperspectral image, a polarimetric image, a plenoptic image, and/or a spatially multiplexed image.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 11A shows an alternative time-encoded, polarization-multiplexed imaging system.

FIG. 11B shows images of the polarization-dependent point spread function (PSF) at the SLM plane in the system of FIG. 11A for different input polarizations.

FIG. 15C illustrates images of the modulated LEDs in FIG. 15A sampled with a DFPA with up/down counters like the one shown in FIG. 15A.

DETAILED DESCRIPTION

Figure 1:
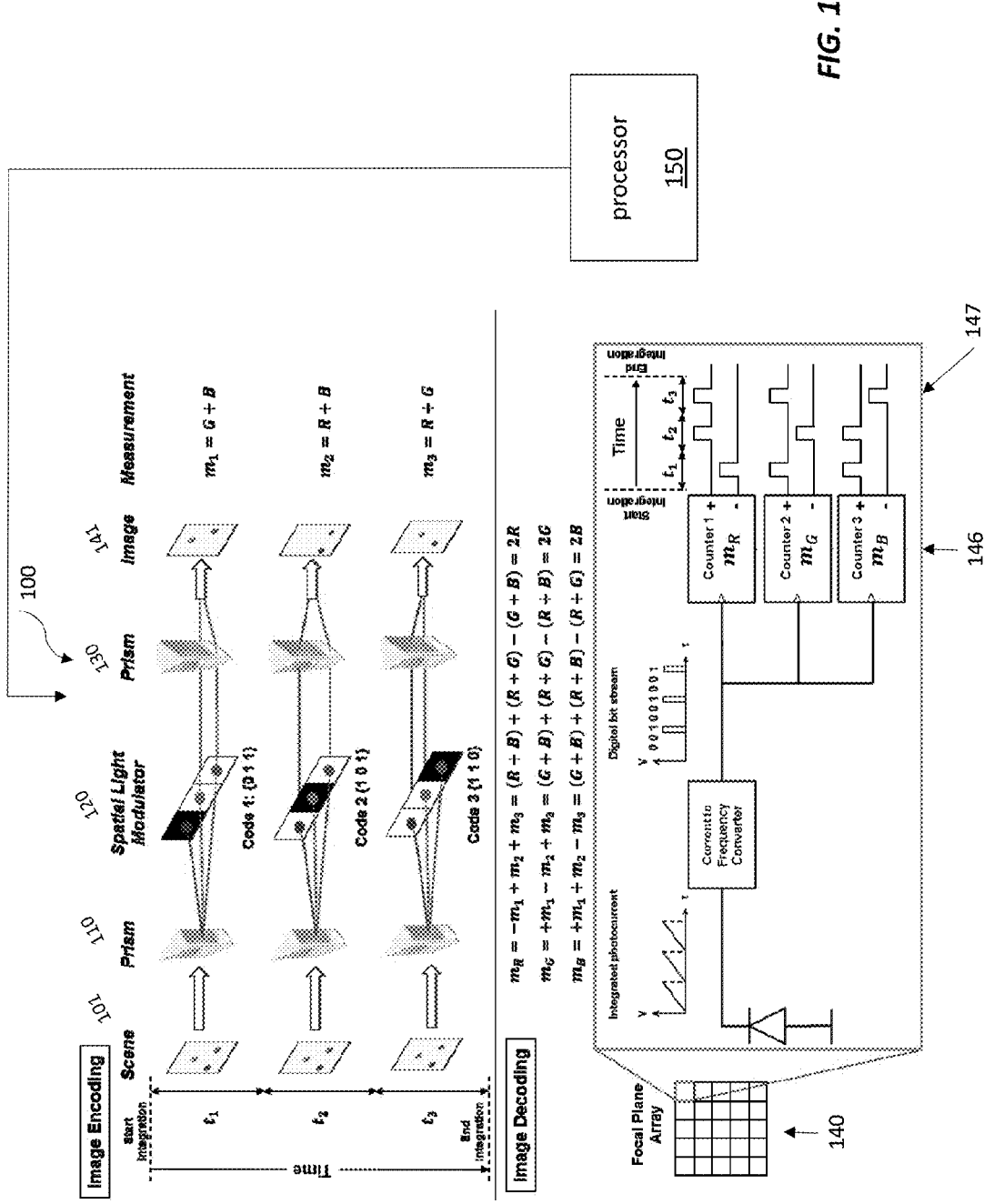
FIG. 1 shows a time-encoded, spectrally multiplexed system that performs image encoding with a spatial light modulator (top) and image decoding with a digital focal plane array (DFPA) (bottom).

Time-encoded multiplexing imaging systems map different spectral features, polarization features, fields of view, or ray angles in a scene to orthogonal temporal codes. This allows them to measure information from an observed scene more efficiently than other imaging technologies. Time-encoded multiplexing is useful in multi-dimensional imaging applications, including but not limited to hyperspectral imaging, imaging polarimetry, plenoptic imaging, three-dimensional (3D) imaging, and optically multiplexed imaging.

In a conventional imaging system, a single pixel on the focal plane can measure only one degree of freedom of the multi-dimensional light field at any moment in time. For example, a conventional pixel measures only integrated light intensity. Conversely, a single pixel in a time-encoded multiplexing system can simultaneously capture multiple degrees of freedom in each measurement. As a result, a time-encoded multiplexing imaging system can operate more quickly and/or with higher image resolution than a conventional imaging system. Operating more quickly with little to no degradation of signal-to-noise ratio (SNR) or spatial resolution enables staring imaging systems that can capture fast temporal phenomena and scanning imaging systems that can scan over large areas.

Conventional imaging systems typically scan consecutively through a number of measurements, which degrades either the temporal resolution or frame rate of the sensor. These conventional systems are challenged when observing moving scenes or when placed on moving platforms. Other conventional systems disperse the degrees of freedom of a light field across the detector array to simultaneously make multiple measurements. These systems suffer a loss of spatial resolution, producing an image with fewer pixels than the focal plane.

Conversely, time-encoded multiplexed imaging systems can measure multiple degrees of freedom of a light field simultaneously without sacrificing spatial or temporal resolution. In other words, an example time-encoded multiplexing imaging system can acquire multidimensional data with both fine spatial and fine temporal resolution. The orthogonal parallelized measurement used in time-encoded multiplexed imaging offers many benefits, including: 1) rapid simultaneous measurements of every imaging channel (e.g., enabling higher video rates) and/or 2) higher SNR than conventional imaging systems.

Multiple applications exist for time-encoded multiplexed imaging systems in industrial and defense settings. In the area of hyperspectral imaging, applications include but are not limited to: precision agriculture, biotechnology, environmental monitoring, food inspection, industrial material identification, pharmaceuticals, defense and security. Other applications include plenoptic cameras (e.g. 3D facial recognition), imaging polarimetry (e.g., remote sensing), and optically multiplexed imaging (e.g., extreme panoramic video).

One particular example of this technology is hyperspectral imagers for drones. A low-flying or maneuvering drone observes a quickly moving scene. The ability to collect fast video-rate hyperspectral data increases the coverage rate of a drone used to identify materials in a scene. This could be used to speed up agricultural inspections or to quickly identify dangerous materials in an industrial or defense application.

A Time-Encoded, Spectrally Multiplexed Imaging System

FIG. 1 illustrates an imaging system 100 that temporally encodes and decodes different spectral features in the light field. The imaging system 100 includes an optical train (top of FIG. 1) that encodes the light field and images the encoded light field from a scene 101 onto a digital focal plane array (DFPA) 140, which detects and decodes an encoded image 141 of the scene (bottom of FIG. 1).

The optical train of the imaging system 100 shown in FIG. 1 includes a prism 101, grating, or other dispersive element that spatially separates different spectral components of the light field. A spatial light modulator (SLM) 120 modulates the amplitudes of each spectral component of the light field with a predetermined sequence in time. The SLM 120 can be a liquid-crystal SLM that operates in a transmissive geometry (e.g., as shown in FIG. 1) or reflective geometry, a digital micromirror device (DMD) or deformable mirror that operates in a reflective geometry, a metamaterial device, shutter or light-blocking element, or any other suitable device as known in the art. It can encode signals by redirecting, blocking, or transmitting light, e.g., to produce binary (100% or 0%) modulation or partial attenuation (grayscale) modulation. It may also modulate the phase of the incident light. Phase modulation may include a linear phase term or so-called tilt, a quadratic phase term or so-called defocus, or a higher order phase term.

Different wavelengths of light illuminate different regions of the SLM 120, which allows multiple wavelengths to be amplitude modulated in parallel with different sequences (e.g., code 1, code 2, and code 3 shown in FIG. 1). (The SLM 120 can also phase-modulate the different wavelengths for coherent detection.) The light modulated by the SLM 120 is recombined with another dispersive element (here, another prism 130) to form a subsequent image 41 that has time-encoded wavelength information.

In other examples, the dispersive element(s) and SLM may be selected and/or positioned to encode other types of components of the light field. For instance, the optical train may include birefringent optics to separate and encode polarization features. Or the optical train may include an SLM placed in a pupil plane to encode plenoptic or multiplexed field-of-view (FOV) information.

An optical detector—here, a DFPA 140—converts incoming photons in the image 141 into a digital signal. Each pixel in the DFPA 140 includes a photodetector 142 that generates an analog photocurrent 143 whose amplitude is proportional to the incident photon flux. A current-to-frequency converter 144 coupled to the photodetector 142 converts the analog photocurrent 143 in each pixel to a digital bit stream 145 (this analog-to-digital (A/D) conversion may also be performed in the readout electronics). For practical implementations, A/D conversion at the pixel level is faster because it happens on many pixels in parallel. This allows time-encoded signals to be sampled at kilohertz to megahertz frequencies, which enables high framerate multidimensional motion imagery without the loss of spatial resolution suffered by alternative methods. For more information on A/D conversion at the pixel level and DFPAs, please see U.S. Pat. Nos. 8,179,296, 8,692,176, 8,605,853, and 9,270,895, each of which is incorporated herein by reference in its entirety.

One or more (up/down) counters 146 in each pixel record use time-modulated sampling schemes to decode and store information 147 in the digital bit stream 145. For example, the counters 146 may sample the digital bit stream 145 in a pattern that is the mathematical inverse of the modulation applied by the SLM 120. Each counter (in each pixel) may sample the bit stream 145 with a different modulation pattern, making it possible to sense different colors (with different modulations) in different sections of the DFPA 140. A processing unit 150 coupled to the DFPA 140 calculates the product of the SLM and counter modulation steps to produce a direct measurement of the encoded degree of freedom of the light field.

This processing can be performed in electronics at the pixel level (e.g., the counters 146), in the readout electronics, on a dedicated circuit (e.g., the processor 150) such as an application-specific integrated circuit (ASIC) or field-programmable gate array (FPGA), in post processing, or some combination thereof. In-pixel processing is a powerful and efficient way to parallelize the processing and is another capability of the DFPA 140. For instance, the counters 146 in the DFPA pixels can be modulated independently to allow simultaneous measurement of multiple signals encoded by the SLM 120.

The DFPA 140, processor 150, and/or other electronics (not shown) may execute the encoding and decoding process. This involves selecting the modulation patterns used by the SLM 120, DFPA 140, and processor 150 along with the additional data processing steps used to recover the light field. An example of an encoding framework may be described by applying Hadamard or S-matrix codes in the SLM 120, DFPA 140, and processor 150.

Operation of a Time-Encoded, Spectrally Multiplexed Imaging System

To illustrate time-encoded multiplexed imaging, consider a single spatial pixel. Each pixel can operate independently, so this technique can scale to any size array of pixels. In FIG. 1 (top), a single spatial pixel contains three spectral colors: red, green, and blue. These colors are assigned the orthogonal codes $\{0,1,1\}$, $\{1,0,1\}$, and $\{1,1,0\}$. The light is dispersed through the first prism 110 onto three pixels on the SLM 120, then recombined and measured at a single pixel detector 142 in the DFPA 140. During the integration period, the three codes are sequenced and the detector 142 makes three measurements. During the first time sequence ($t_1$), the SLM 120 is set to the first code $\{0,1,1\}$, which blocks the red light so the measurement $m_1$ is a sum of green and blue. This is repeated for the subsequent codes for a total of three measurements. An estimate of the amount of red, green, and blue light within the pixel can be calculated by addition or subtraction of the measurements. For example, the blue channel is the addition of the first two measurements and subtraction of the third measurement.

The image decoding can be performed independently of the measurement by reading out an image frame for each time sequence; however, the frame rate of the imager (DFPA 140) limits the image decoding rate, which in turn limits the hyperspectral data (hypercube) acquisition rate. For example, at 100 frames/sec and 200 spectral channels, the acquisition rate is 0.5 Hz.

Implementing decoding with the DFPA 140 enables much faster hypercube acquisition rates because the decoding can be performed in parallel and at the same time as the measurement. In a digital focal plane array (bottom of FIG. 1), each pixel has an analog-to-digital converter (ADC) in the form of a current-to-frequency converter 144. The ADC converts the input photocurrent 143 into a digital pulse stream 145, and one or more counters 146 count the number of pulses within a given integration period. The magnitude of the count is proportional to the incident photon flux. The counters 146 can be controlled individually to count up, down, or not at all such that a duobinary $\{-1,0,+1\}$ modulation signal can be applied.

To decode the three-channel example, each of the counters 146 is set to count up or down during the time sequences. For example, to implement the first code at $t_1$, the first counter is set to count down, and the second and third counters are set to count up. At the end of the integration period, each counter 146 has an estimate of its corresponding color channel. In other words, the counters 146 store spectrally multiplexed images of the scene. This in-pixel decoding can occur at Megahertz rates. At a rate of 1 MHz, the system 100 can acquire 200 spectral channels at a rate of 5 kHz (10,000 times greater than a 100 frames/sec imager).

Mathematically, the encoded light (g) can be represented as a product of an encoding matrix ($W_E$) and a feature vector (f): $g = W_E f$, where f is an N×1 vector of the spectral channels, $W_E$ is an N×N matrix with each row corresponding to an orthogonal code, and N is the number of spectral channels. In order to recover the original spectral information, g is multiplied by a decoding matrix ($W_D$): $\hat{sI}=W_D g$ such that $sI=W_E W_D$, where I is the identity matrix and s a scalar constant. For example, for a vector of length N, a Hadamard matrix of rank N can be used for both $W_E$ and $W_D$, and s=N. In practice, it may not be practical to use a Hadamard matrix for $W_E$ since it can be difficult to apply a negative modulation to light. Instead the S-matrix is used, which contains only binary values (0,+1) and is rank N−1. To convert a Hadamard matrix to a S-matrix: $W_E=S=(1-H)/2$.

More specifically, a Hadamard matrix of rank n ($H_n$) can be used to represent the 2-dimensional wavelength and time binary encoding pattern applied by the SLM 120. A related matrix, which is also $H_n$ in this example, represents the 2-dimensional parallelized time-encoded modulation of the pixel in the DFPA 140. This +1,−1 modulation can be implemented with a counter that can count up and down as explained above. If the incoming wavelength intensity spectrum on each pixel in the DFPA 140, is represented as a vector Ψ, then the estimate of the wavelength spectrum, $\hat{\Psi}$, can be written as:

$$\hat{\Psi} = \left(\frac{1}{n}\right) H_n H_n \Psi$$

Alternatively, an S matrix of rank n ($S_n$) is used to represent the 2-dimensional wavelength and time binary encoding pattern applied by the spatial light modulator. A related matrix, which is also $S_n$ in this example, represents the 2-dimensional parallelized time encoded sampling of the pixel. Again, Ψ represents the raw system measurement (i.e., the signal measured on each digital register in the DFPA). The measurement in each counter is scaled by a term related to the rank of the S matrix, and then offset by a term related to an non-encoded measurement to yield an estimate of the wavelength spectrum, $\hat{\Psi}$. A J matrix (matrix of ones) is used to represent the non-encoded term which may be measured directly or approximated from the encoded data.

$$\hat{\Psi} = \left(\frac{1}{2^{m-2}}\right) S_n S_n \Psi - J\Psi$$

$$\text{rank}(S) = n = 2^m - 1$$

Time-Encoded Super-Resolved Imaging Systems

Temporal encoding can also be used in super-resolution imaging. As understood by those of skill in the art, super-resolution imaging refers to enhancing the (spatial) resolution of an imaging system. A super-resolution imager can resolve spots that are tinier than the system's diffraction limit, can resolve more spots than there are pixels in the image sensor, or both.

Figure 2:
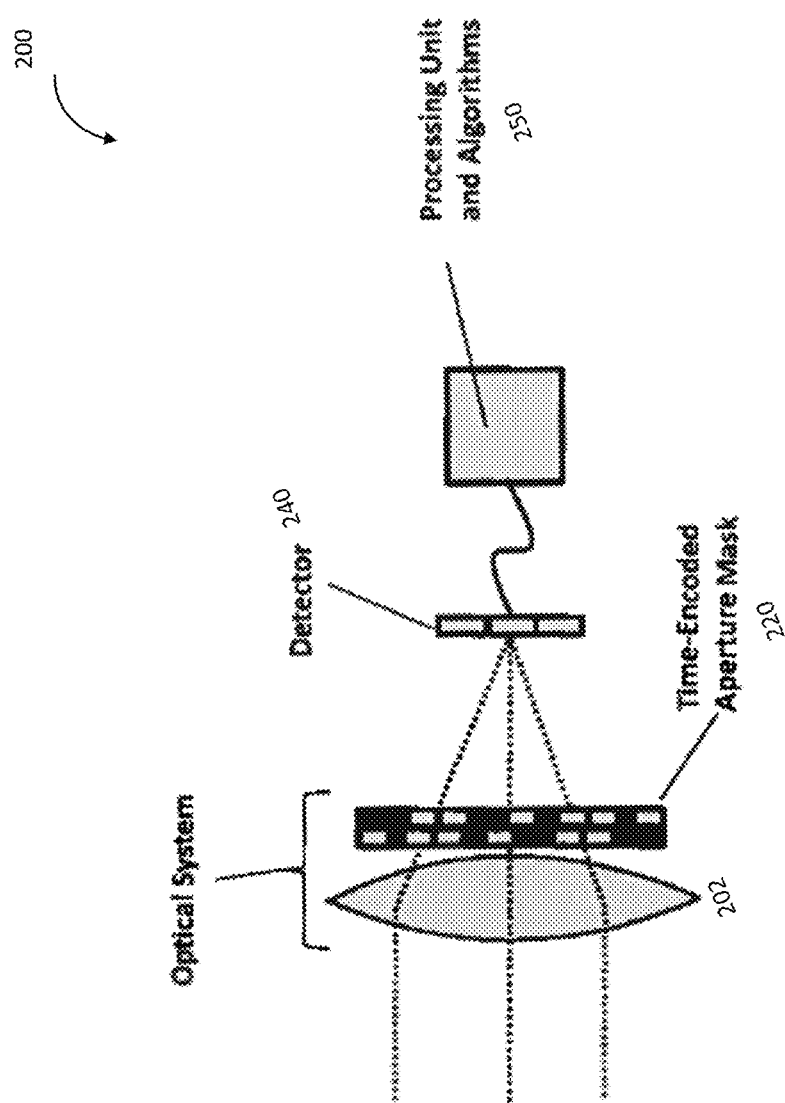
FIG. 2 shows an alternative system for time-encoded, spectrally multiplexed imaging.

FIG. 2 shows a time-encoded super-resolved imager 200. It includes a lens 202 and a time-encoded aperture mask 220, which can be implemented with an SLM, placed proximate to an intermediate focal plane of the lens 202. Time signatures are embedded into light passing through different regions of the time-encoded aperture mask 220. A detector 240, such as a DFPA, in the focal plane of the lens 202 detects the time signatures. The detector 240 and a processing unit 250 process the time signatures to produce a super-resolved image of the scene observed by the imager 200.

Figure 3:
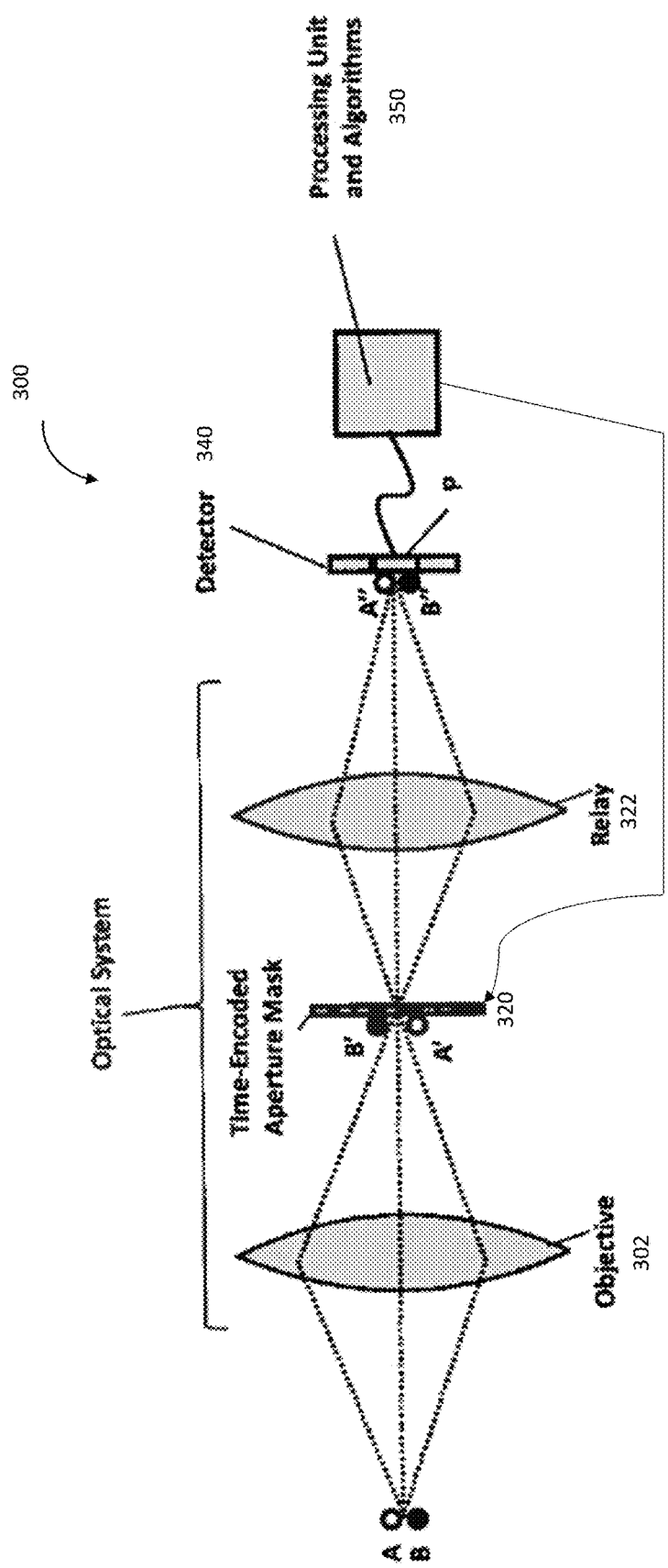
FIG. 3 shows a time-encoded super-resolved imaging system.

FIG. 3 shows a time-encoded imaging system 300 that encodes different positions in a scene with different temporal codes. In this example, the system 300 observes objects at positions A and B. An objective element 302 forms intermediate images A' and B' on a time-encoded aperture mask 320, such as an SLM. The spatial resolution of the time-encoded aperture mask 320 is sufficient to uniquely encode time signatures into images A' and B'. A relay element 322 reimages A' and B' to form the final images A" and B" on a detector 340, such as a DFPA. The spatial resolution of the detector 340 is insufficient to spatially resolve A" and B" because both spots fall within a given pixel P. Time-modulated signals of objects A and B are measured by pixel P (e.g., as explained above with respect to FIG. 1). The detector 340 and a processing unit 350 separate the time-modulated signals and use knowledge of the spatial mapping between the time-encoded aperture mask 320 and the detector 340 to produce a super-resolved image. In other words, the detector 340 and/or processor 350 recover multiple points of spatial information from each pixel on the detector 340 using the temporal codes. The processor 350 may synthesize one or more images from this spatial information.

Dispersing and Recombining Time-Encoded Imager

Figure 4:
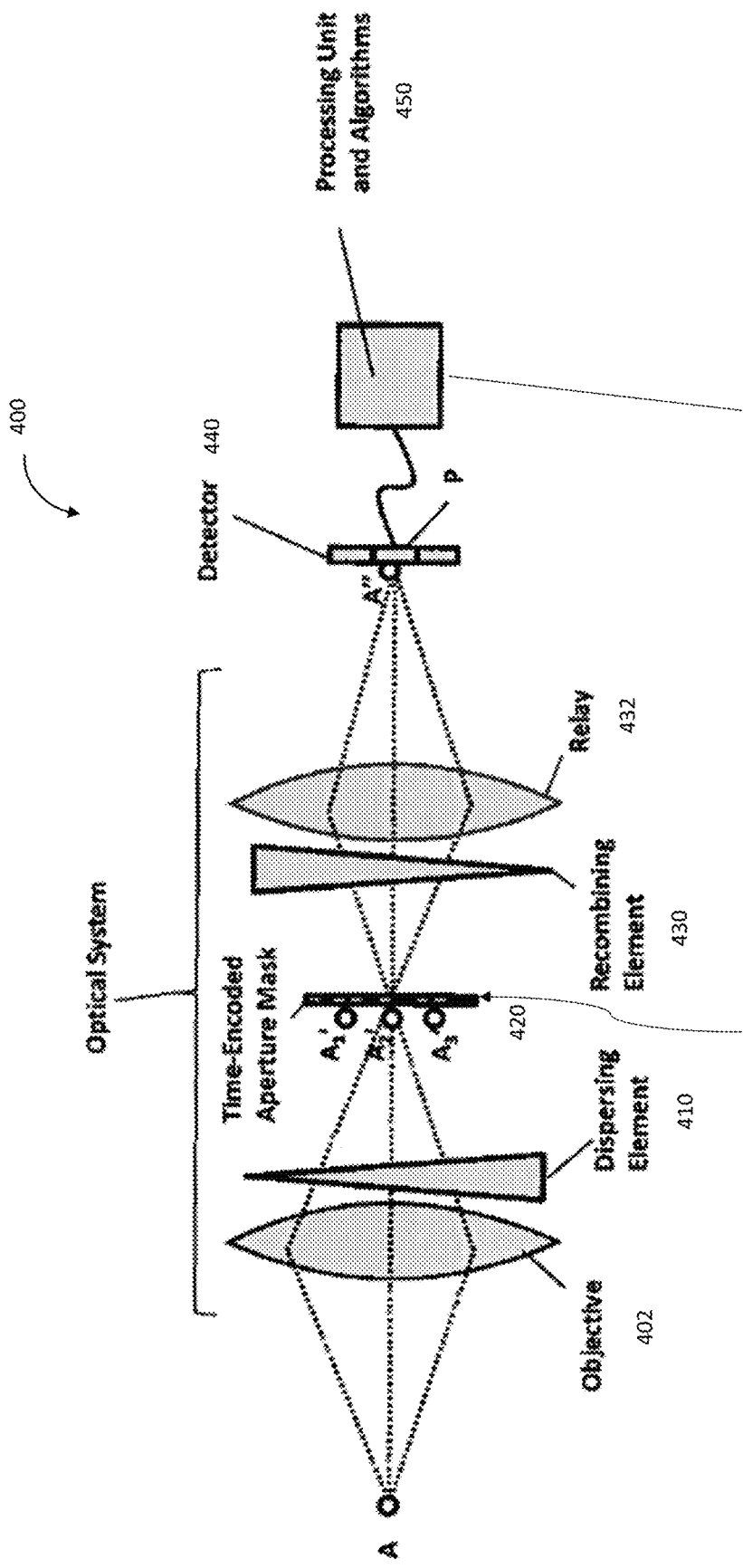
FIG. 4 shows a dispersing and recombining time-encoded imaging system.

FIG. 4 shows a dispersing and recombining time-encoded imager 400 like the imaging system 100 shown in FIG. 1. The imager 400 spatially disperses degrees of freedom of the light field prior to a coded mask (SLM 420) and then spatially recombines those degrees of freedom after the coded mask such that the image reaching the detector is spatially congruent with the observed scene. In this case information, at each detector pixel represents different components of the light field that are temporally encoded with different modulation sequences.

The imager 400 observes an object at position A. Together, an objective element 402 and a dispersing element 410 form an intermediate image of the object in which different light field components (e.g., different wavelengths or polarizations) are spatially separated on a time-encoded aperture mask 420, such as an SLM. The time-encoded aperture mask 420 encodes time signatures into the dispersed image features $A_1'$, $A_2'$, and $A_3'$. Light then passes through a recombining element 430 that reverses the dispersion from the dispersing element 410. A relay element 432 then forms an image A" on pixel P of a detector 440 (e.g., a DFPA) that is spatially congruent with the object at position A. Time-modulated signals of the light field components are measured by pixel P. A processing unit 450 separates the time-modulated signals.

Knowledge of the spatial dispersion at the time-encoded aperture mask 420 allows the signals to be attributed to known light field components. For example, if a wavelength spectrum is dispersed via a prism or diffraction grating the signals associated with modulation of $A_1'$, $A_2'$, and $A_3'$ will represent different known wavelength regions of the multi-spectral image A". Alternatively a polarization dispersing element such as a birefringent prism may be used to disperse polarization states of the light field and form an image of multiple polarization states of the object A.

In the example shown in FIG. 4, a single point object is depicted. An extended object produces a dispersed intermediate image in which a light field component from one object point may be superimposed with a different light field component from another object point. In this case, knowledge of the spatial dispersion pattern at the time-encoded aperture mask 420 allows for encoded signals to be attributed with the proper light field component.

Plenoptic/Optically Multiplexed Time-Encoded Imaging Systems

Figure 5A:
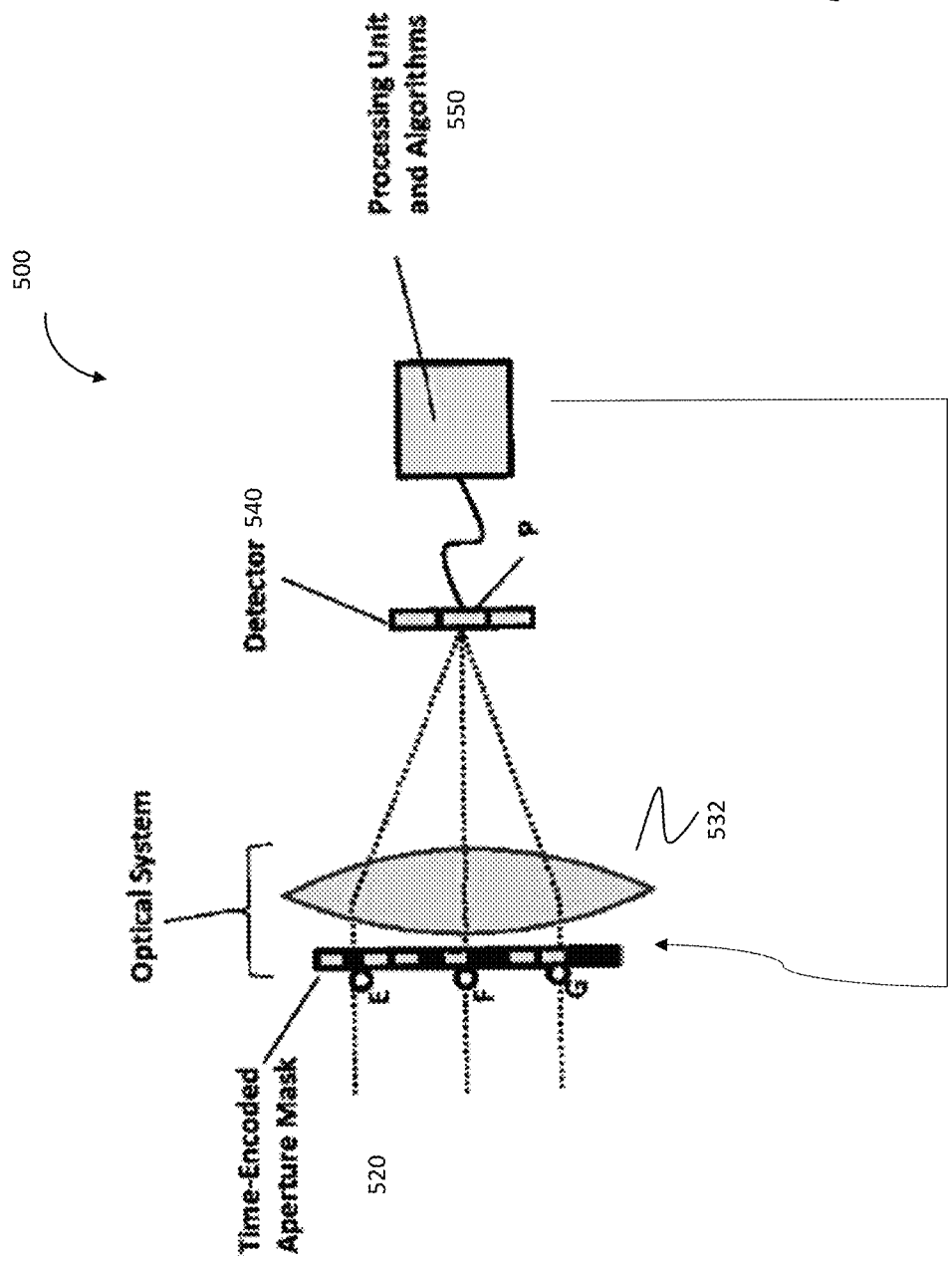
FIG. 5A shows a system with a time-encoded aperture mask proximate to a pupil plane.

FIG. 5A shows a plenoptic/optically multiplexed time-encoded imaging system 500. In this system 500, a time-encoded aperture mask 520, such as an SLM, is placed proximate to the aperture stop or proximate to a conjugate pupil image to encode passing light with a single that may be correlated to the pupil region from which it entered. The time-encoded aperture mask 520 encodes time signatures into light passing through different aperture regions (a.k.a. pupil regions). A lens 530 focuses light entering pupil regions E, F, and G onto a pixel P of a detector 540, such as a DFPA. A processing unit 550 coupled to the detector 540 associates the signals entering pixel P with the pupil region from which they entered.

In plenoptic imaging, the processor 550 correlates the pupil positions (E, F, and G) and image position (P) to determine ray angles. In optically multiplexed imaging, the processor 550 uses the division of aperture optical architecture pupil region information to de-multiplex different imaging channels (E, F, and G).

Figure 5B:
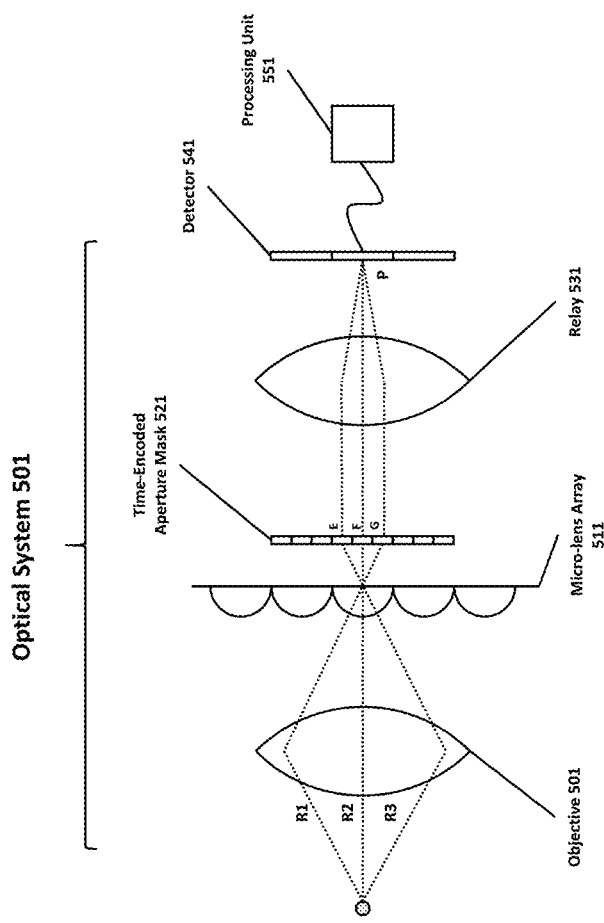
FIG. 5B shows a system for multiplexed ray angle imaging.

FIG. 5B shows a system 501 for multiplexed ray angle imaging. The objects' ray angles, R1, R2, R3 are focused with an objective lens 501 onto a microlens array 511 with a time-encoded mask 521 placed behind the microlens array 511. The time-encoded mask 521 modulates the amplitudes of R1, R2, and R3 at positions E, F, and G, respectively. A second lens 531 relays the resulting modulated image to a detector 541 where it is sampled at a single pixel P. A processing unit 551 coupled to the detector 541 decodes the measurement at pixel P to recover the ray information of R1, R2, and R3.

Spatially Multiplexed Time-Encoded Imaging Systems

Figure 5C:
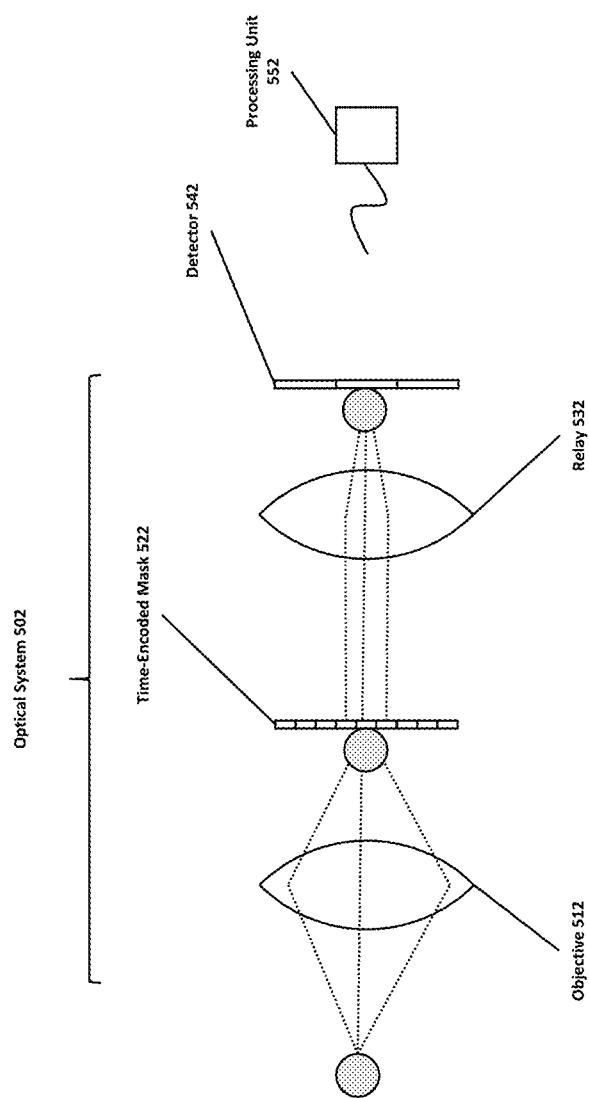
FIG. 5C shows a system for spatially multiplexed imaging.

FIG. 5C shows a system 502 for spatially multiplexed time-encoded imaging. A first lens 512 images an object onto a time-encoded mask 522. The time-encoded mask 522 modulates the amplitudes of the image at different positions, temporally encoded each object position resolvable with the first lens 512 and mask 522. A second lens 532 relays the resulting modulated image to a detector 542, which has fewer sensing elements (detector pixels) than the time-encoded mask 522 has modulating elements (modulator pixels). In other words, multiple modulator pixels on the time-encoded mask 522 are imaged onto each detector pixel in the detector 542. A processing unit 552 coupled to the detector 542 decodes the detector measurements to distinguish the different object features imaged onto each detector pixel based on the different temporal modulations applied by the time-encoded mask 522.

Multiple Time-Encoded Aperture Masks for Optically Multiplexed Imaging

Figure 6:
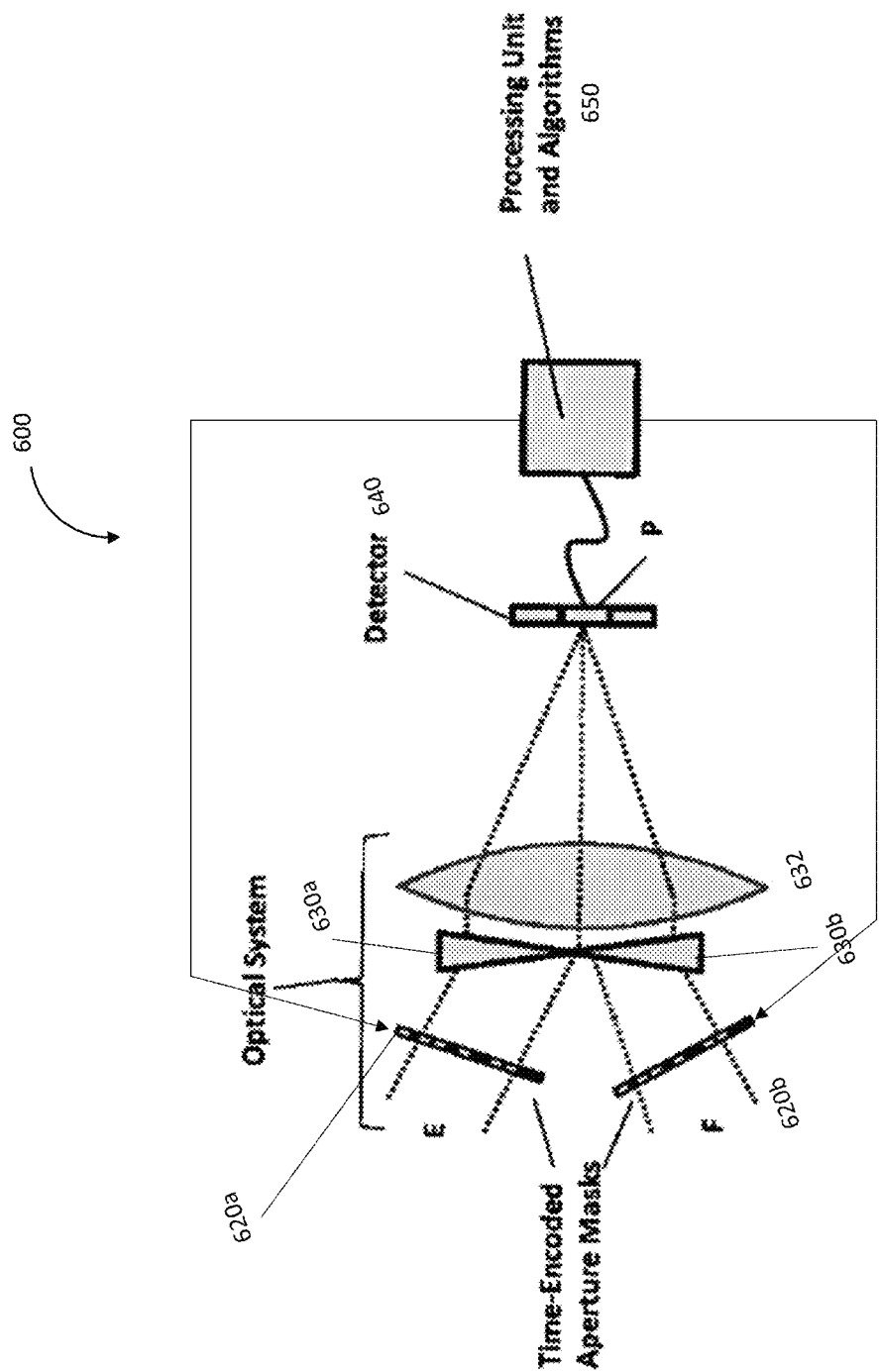
FIG. 6 shows a system with multiple time-encoded aperture masks used in an imaging system with optically multiplexed fields of view.

FIG. 6 shows a system 660 with multiple time-encoded aperture masks 620a and 620b (collectively, time-encoded aperture masks 620) for optically multiplexed imaging. Each time-encoded aperture mask 620 is placed in an imaging channel of the optically multiplexed imaging system 600, which uses a division of aperture architecture to divide the entrance pupil of the system 600 into regions E and F. (Alternatively, a division of amplitude architecture could also be used (i.e., dividing the transmission of the pupil rather than the area).) Prisms 630a and 630b bend the temporally modulated beams emitted by the time-encoded aperture masks 620, e.g., as disclosed in R. H. Shepard et al., "Design architectures for optically multiplexed imaging," Optics Express 23:31419-36 (23 Nov. 2015), which is incorporated herein by reference in its entirety. A lens 632 images the temporally modulated beams onto a detector array 640, which is coupled to a processing unit 650 that separates the modulated signals into the separate imaging channels.

Temporally modulating each imaging channel embeds a true signature into each imaging channel such that signals in a pixel P of the detector array 640 can be associated with the correct imaging channel. Each time-encoded aperture mask 620 may be a single spatial element per channel (such as a shutter) to encode the entire channel uniformly. Or each aperture mask 620 may have finer spatial resolution to encode spatial information within each channel.

A Dispersing Time-Encoded Imager

Figure 7:
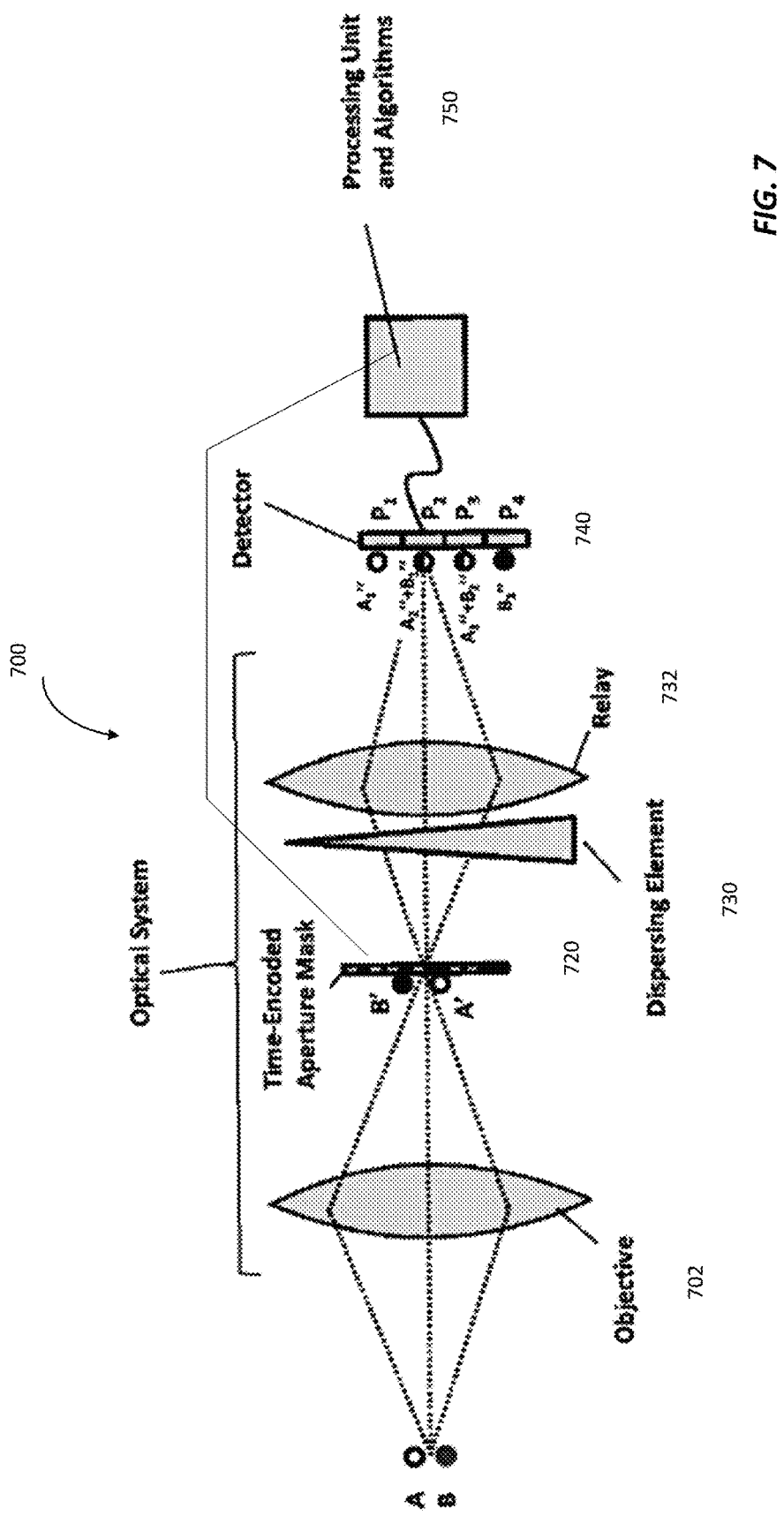
FIG. 7 shows a dispersing time-encoded imaging system.

FIG. 7 shows a dispersing time-encoded imager 700 that observes objects at positions A and B. An objective element 702 produces intermediate images A' and B' on a time-encoded aperture mask 720, such as an SLM, that is spatially congruent with the object. The elements of the time-encoded aperture mask 720 encode the intermediate image with time signatures that may be associated with the object's 2D spatial information. Light then passes through a dispersing element 730, such as a prism or grating, and is focused by a relay lens 732 to a detector 740. At the detector 740, light field components from the objects at positions A and B ($A_1''$, $A_2''$, and $A_3''$, and $B_1''$, $B_2''$, and $B_3''$) are spatially dispersed and superimposed on pixels $P_1$, $P_2$, $P_3$, and $P_4$. The pixels sample the encoded time patterns and a processing unit 750 coupled to the detector 740 separates the signals.

In this case, the information for spatially reconstructing the dispersed image is encoded in the time signatures. Knowledge of the spatial dispersion pattern is used along with the observed pixel location to determine the light field components. For example, in a multi-spectral application, the dispersing element 30 may disperse the multi-spectral image A' into the known narrow wavelength regions $A_1''$, $A_2''$, and $A_3''$. Wavelength information is obtained by observing the time-encoding pattern associated with object point A in three different pixels on the detector 740.

Division of Aperture Optically Multiplexed Imaging

Figure 8:
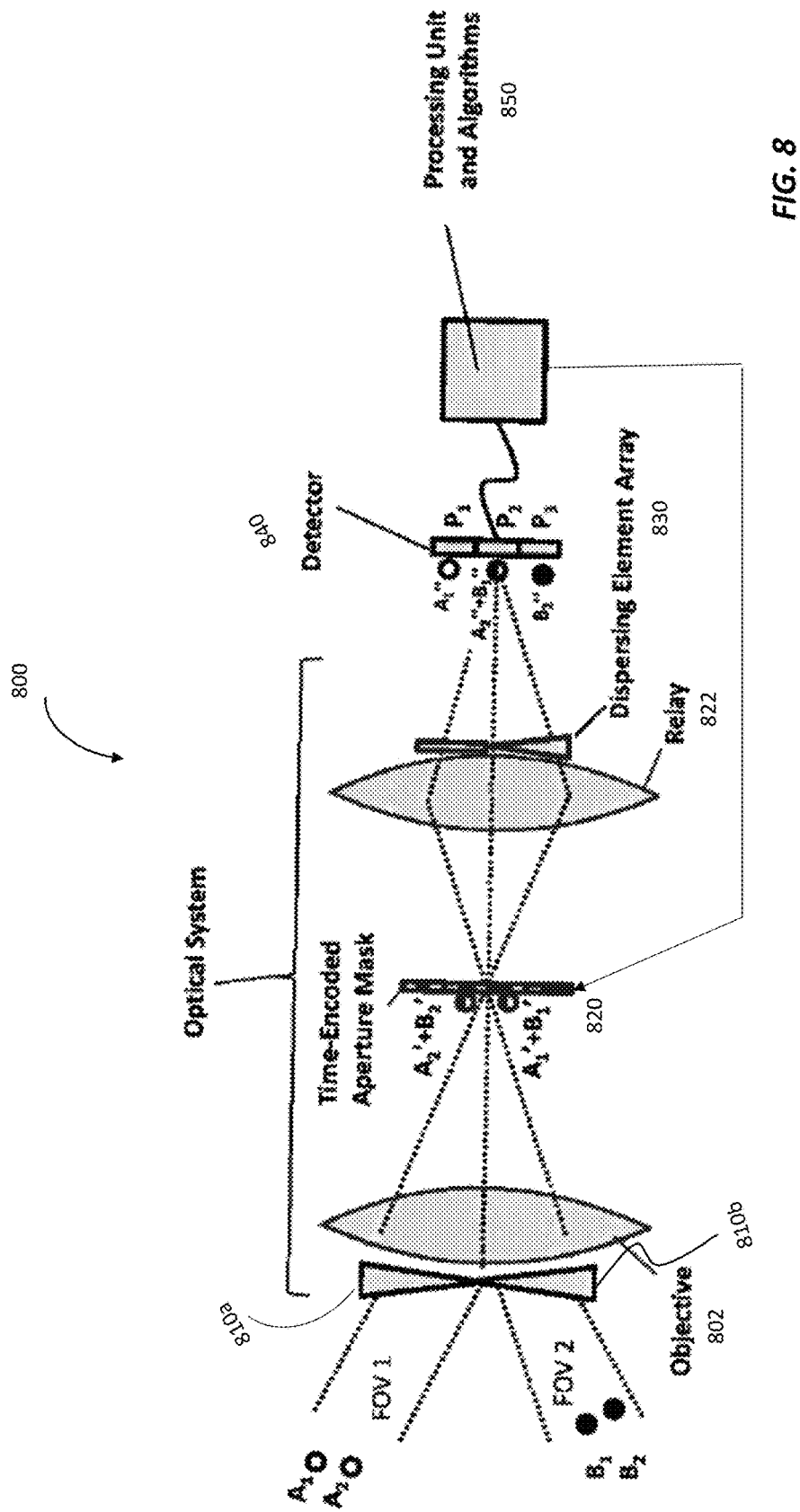
FIG. 8 shows a dispersing time-encoded imaging system for division of aperture optically multiplexed imaging.

FIG. 8 shows a dispersing time-encoded imager 800 for division of aperture optically multiplexed imaging. In this optical system, the degrees of freedom of the light field are dispersed after a time-encoded aperture mask 820 and are not spatially recombined such that the image reaching the detector 840 is spatially incongruent with the observed scene. In this case the temporally encoded information in each detector pixel is used in conjunction with the known spatial dispersion pattern to computationally reconstruct an image that is spatially congruent with the scene that contains additional light field information.

Prisms 810a and 810b in the image 800 direct two fields of view (FOV 1 and FOV 2) into the system 800. FOV 1 contains two objects $A_1$ and $A_2$, and FOV 2 contains two objects $B_1$ and $B_2$. An objective lens 802 forms intermediate overlapping images of FOV 1 and FOV 2 on a time-encoded aperture mask 820, such as an SLM, in which the images $A_1'$ and $A_2'$ are superimposed with $B_1'$ and $B_2'$, respectively. The elements of the time-encoded aperture mask 820 encode the multiplexed intermediate images with time signatures that are associated with the multiplexed intermediate images' 2D spatial information. The encoded light passes through a relay lens 822 and a dispersing element array 830 that is spatially matched to the divided pupil regions so as to disperse each channel differently. The relay lens 822 produces final images $A_1''$, $A_2''$, $B_1''$, and $B_2''$ on pixels $P_1$, $P_2$, $P_3$ of a detector array 840. The pixels sample the time-encoded patterns, and a processing unit 850 coupled to the detector array 840 separates the signals. The processing unit 850 de-multiplexes the final image by observing multiple signals in each pixel and correlating this information with the known dispersion pattern. In this example, pixel $P_2$ measures a superposition of information from FOV 1 and FOV 2, but this information can be disambiguated because the signals from object $A_2$ and object $B_1$ are encoded differently by the aperture mask 820.

1-Dimensional and 2-Dimensional Dispersing Elements

The dispersing elements shown in FIGS. 1, 4, 7, and 8 may disperse the light field in one or two dimensions. This may be done as part of a dispersing and recombining arrangement (FIGS. 1 and 4) or in a dispersing arrangement (FIGS. 7 and 8).

Figure 9:
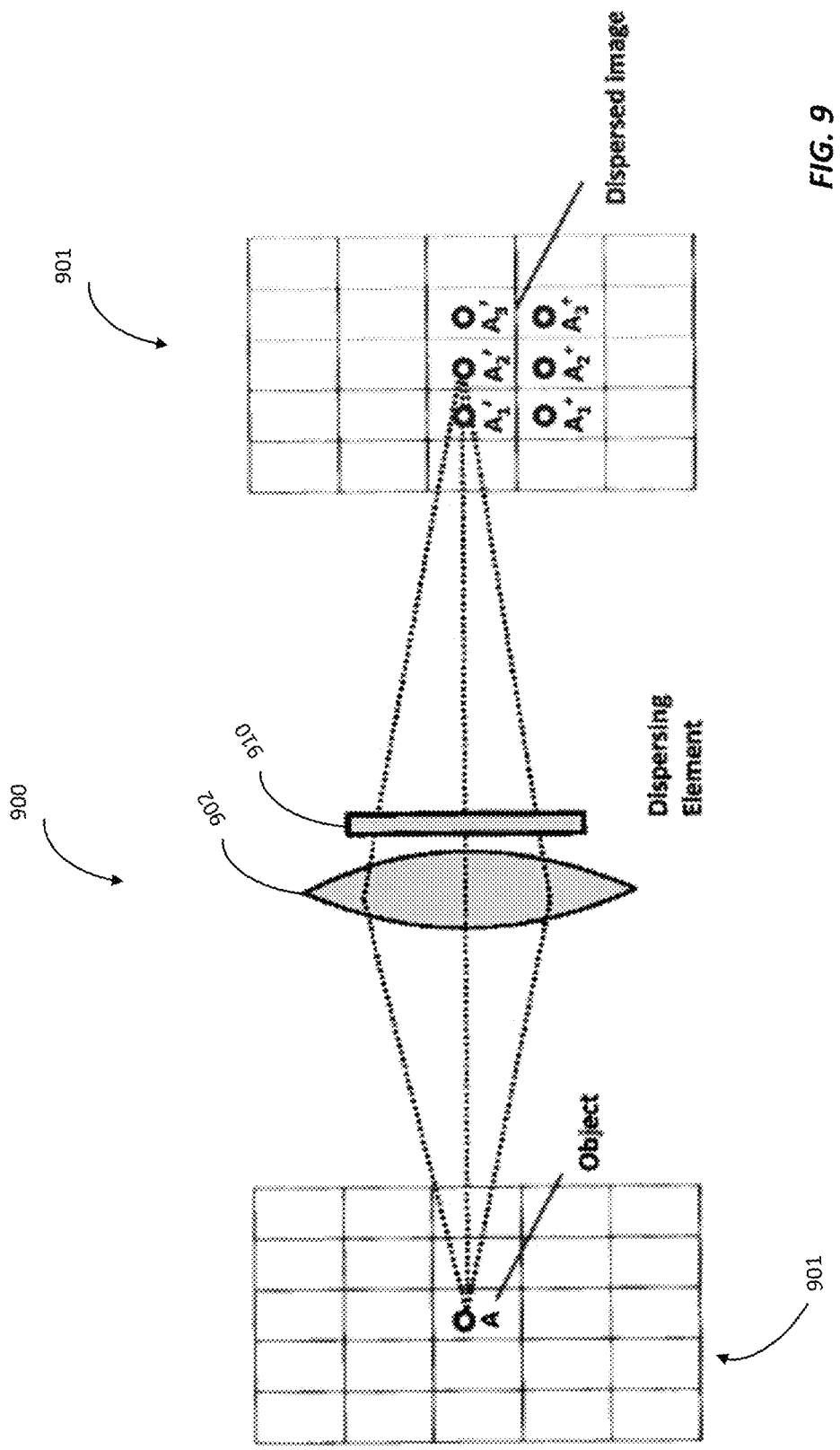
FIG. 9 shows a dispersing time-encoded imaging system with a two-dimensional dispersing element.

FIG. 9 shows a two-dimensionally dispersing time-encoded imager 900. It can encode multiple degrees of freedom simultaneously through the use a of a dispersing element that produces a 2-dimensional dispersion pattern on an SLM 910. For example, wavelength information might be dispersed horizontally on the spatial light modulator and polarization information might be dispersed vertically. Other combinations of light field components in other 2-dimensional dispersion patterns can be implemented as well.

The image 900 includes a dispersing element 910, such as a diffractive or holographic element, that disperses light from a single point A in an object plane 901 in two transverse dimensions (e.g., x and y, where z is the direction of propagation). A lens 902 images the dispersed light to different positions $A_1'$, $A_2'$, $A_3'$, $A_1^*$, $A_2^*$, and $A_3^*$ in an image plane 911. Dispersing light in two dimensions allows for multiple components of the light field to be encoded simultaneously. For example, the dispersing element 910 may disperse light by wavelength coarsely in one dimension and finely in an orthogonal dimensions, e.g., as with a virtual image phased array (VIPA) device. Or a wavelength dispersing prism can be used to disperse the light horizontally and a polarization-dividing prism can be used to disperse the light vertically to produce a spectral-polarimetric imager. Other combinations of light field components can also be dispersed; for instance, a dispersing element array can be used to disperse channels in an optically multiplexed imaging application (FIG. 8) along with a wavelength or polarization dispersing element in the orthogonal direction.

Time Encoding for Different Polarizations

Figure 10A:
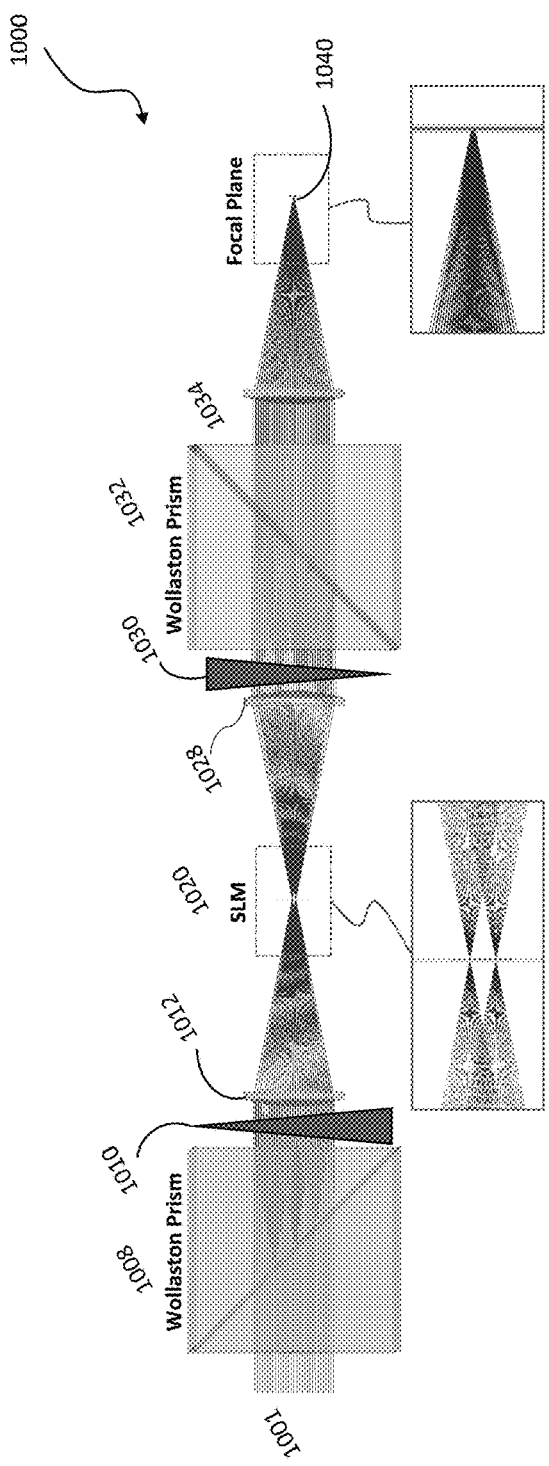
FIG. 10A shows a time-encoded, polarization-multiplexed imaging system.
Figure 10B:
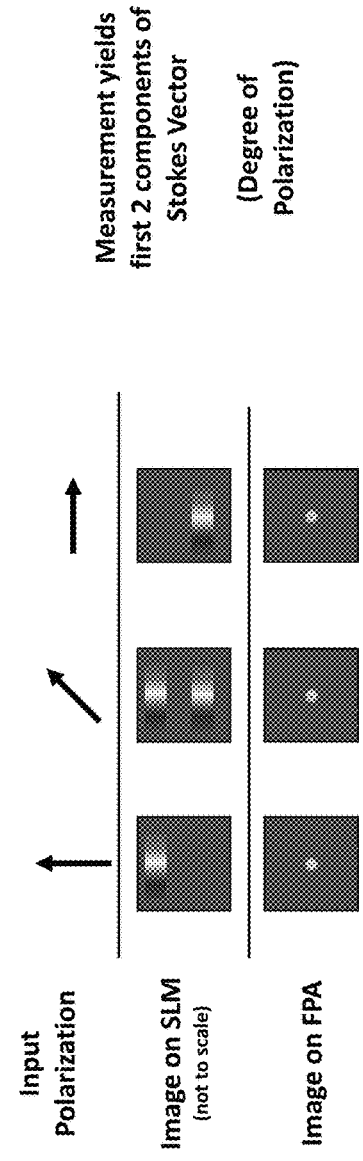
FIG. 10B shows images at the spatial light modulator (SLM) and focal plane array (FPA) planes in the system of FIG. 10A for different input polarizations.

FIGS. 10A and 10B illustrate a system 1000 that time encodes different polarizations of an incident light field 1001. It makes measurements that yield the first two components of the Stokes parameters, which describe the polarization state of light.

FIG. 10A shows the system's components, which include a first Wollaston prism 1008, a first dispersing element (prism) 1010, a first lens 1012, an SLM 1020, a second lens 1028, a second dispersing element (prism) 1030, a second Wollaston prism 1032, a third lens 1034, and an FPA 1040 in optical series with each other. The first Wollaston prism 1008 separates the incident light field 1001 according to its polarization, with vertically polarized light propagating at angle out of the page and horizontally polarized light propagating at an angle into the page. The first dispersing element 1010 vertically separates the different spectral components of the vertically and horizontally polarized beams, producing spots in the plane of the SLM 1020 that are separated by polarization state and wavelength. The SLM 1020 modulates the phase and/or amplitude of each spot (light field component) as a function of time using, e.g., Hadamard encoding. The second dispersing element 1030 and second Wollaston prism 1032 recombine the modulated light field components. And the FPA 1040 senses the combined intensities of recombined light field components.

FIG. 10B illustrates the light field for different input polarizations at different planes within the system 1000 shown in FIG. 10A. (The planes in FIG. 10B are rotated about the z axis by 90 degrees with respect to the view shown in FIG. 10A.) The top row shows the input polarization, the middle row shows the intensity in the plane of the SLM 1020, and the bottom row shows the intensity in the plane of the FPA 1040. For vertical and horizontal input polarization, a single band of color appears in the plane of the SLM 1020 and a single spot appears in the plane of the FPA 1040. But for diagonal input polarization, the first Wollaston prims 1008 resolves two different polarization components, which yields two bands of color in the plane of the SLM 1020, with the upper band corresponding to the vertical polarization component and the lower and corresponding to the horizontal polarization component. The second dispersing element 1030 and second Wollaston prism 1032 recombine these components after they have been encoded by the SLM 120 to produce a single spot in the plane of the FPA 1040.

FIGS. 11A and 11B show how the system 1000 of FIGS. 10A and 10B can be extended to measure all four Stokes parameters. More specifically, FIG. 11A shows the front end of a time-encoding imaging system 1100 like the one in FIG. 10A. In this case, however, the system includes four Wollaston prisms 1108a-1108d. Prisms 1108b and 1108d are rotated by 45 degrees about the optic axis. Quarter-wave plates 1106a and 1106b are disposed in front of and aligned to the optical axes of Wollaston prisms 1108a and 1108d, respectively. Together, the Wollaston prisms and quarter-wave plates resolve an incident light field 1101 into a polarization-dependent point-spread function (PSF) in the plane of the SLM 1120. When the light field contains unpolarized light, this polarization-dependent PSF includes eight spots—one pair of spots for each Wollaston prism 1108—with each spot illuminating a different pixel on the SLM 1120. Thus, the SLM 1120 can modulate (and the system 1100 can measure) each Stokes parameter of the incident light field 1101. The back end (not shown) of the system 1100 includes a complementary arrangement of Wollaston prisms and quarter-wave plates that recombine the modulated beams for detection by an FPA (not shown).

FIG. 11B shows the polarization-dependent PSF at the plane of the SLM 1120 in the system 1100 in for different input polarization states. Vertically (0°) polarized light produces seven spots arranged in a horseshoe-like shape with the opening pointed downwards. Rotating the polarization of linearly polarized light changes the orientation of this horseshoe-like shape as shown for horizontally (180°) and diagonally (45° and 135°) polarized light. For left-hand circular (LHC) polarized light and right-hand circular (RHC) polarized light, only six spots appear in the SLM plane. And for arbitrarily polarized light, eight spots of varying intensity appear in the SLM plane. The intensities of these eight spots can be decomposed using the other six patterns of spots shown in FIG. 11B as a basis set to determine the Stokes parameters characterizing the arbitrarily polarized light.

As readily appreciated by those of skill in the art, the Wollaston prisms in FIGS. 10A and 11A can be replaced by other polarization dispersing elements, including but not limited to thin-film devices, crystal optic devices, polarization gratings, and metasurfaces. Some of these devices, including polarization gratings and metasurfaces, may be integrated with wavelength-dispersing elements, such as prisms, gratings, and holographic optical elements.

Experimental Demonstration of a Programmable Hyperspectral Imaging

The time-encoded multiplexed approach enables flexible encoding and decoding. At the spatial light modulator, panchromatic operation can be enabled by fixing the mirrors, and hyperspectral resolution can be decreased to increase hypercube acquisition. At the DFPA, selected codes or linear combinations of codes can be decoded. This capability can be useful for decoding only spectral bands of interest or combinations of spectral bands for spectral matched filtering. For example, for 256 spectral bands approximately half are ignored due to overlap with atmospheric water absorption bands. The DFPA can selectively decode the good bands, whereas both the dispersive and interferometric methods need to measure the entire spectrum.

Figure 12A:
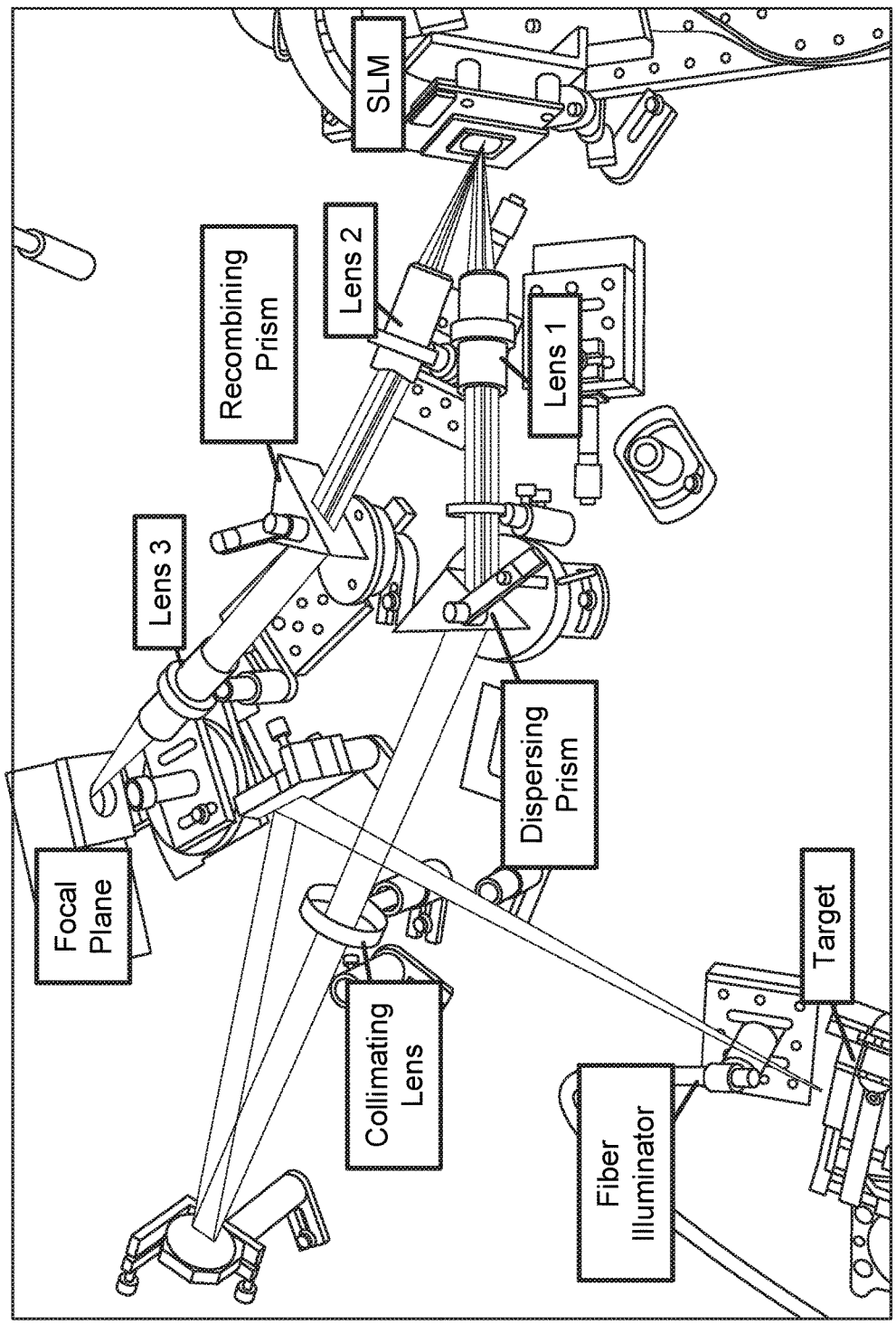
FIG. 12A is a photograph of an experimental implementation of a time-encoded, spectrally multiplexed imaging system.

FIG. 12A is a photograph of a laboratory system that demonstrates flexible encoding and decoding. The laboratory system included commercial of the shelf (COTS) optical elements, a digital micromirror device (DMD) spatial light modulator (SLM) from Texas Instruments, and a custom MIT Lincoln Laboratory 32×32 8-channel digital focal plane array. It was used to image a 1300 nm light-emitting diode (LED) and a 1450 nm LED, each having a spectral width of 100 nm.

Figure 12B:
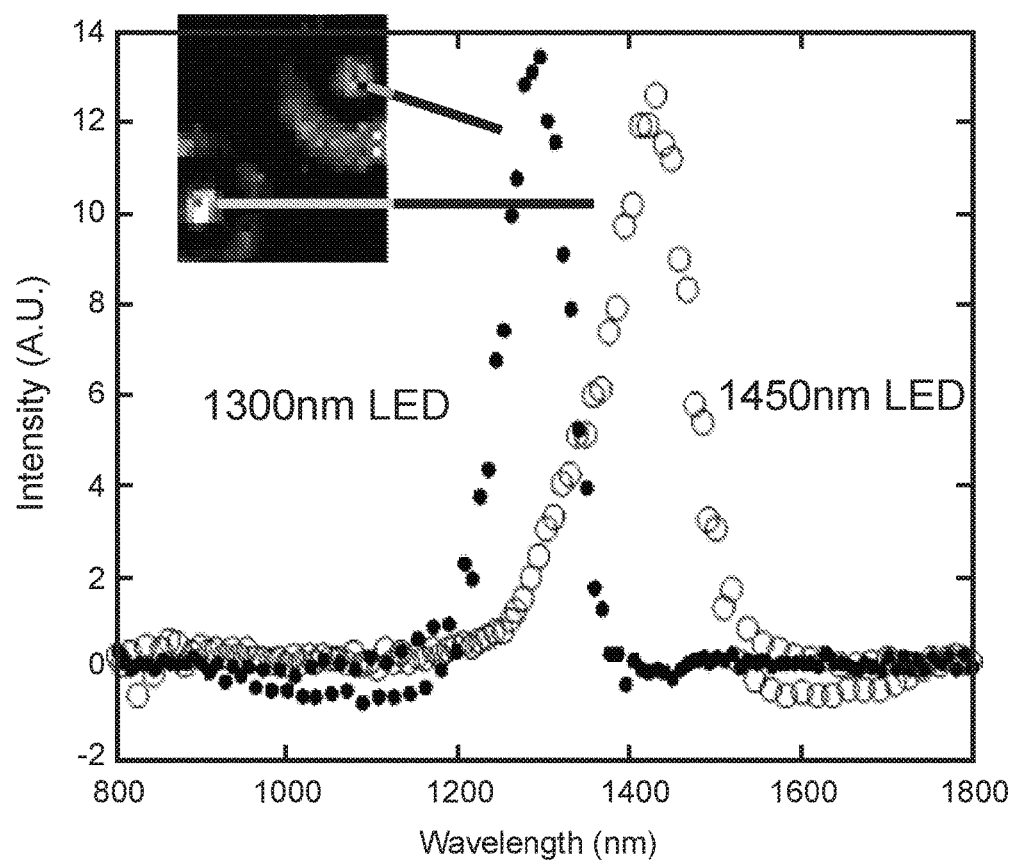
FIG. 12B is a plot of a 128-channel spectrum of two pixels from an image of two LEDs with center wavelengths of 1300 nm and 1450 nm (right) and FWHM of 100 nm collected by the system shown in FIG. 12A.

FIG. 12B is a plot of data collected from the LEDs by the system shown in FIG. 12A. (The inset of FIG. 12B shows the LEDs that were imaged.) It shows the entire decoded spectrum of two pixels of the image with 10 nm spectral resolution; 128 codes are used which involved acquiring 16 frames, 8 codes at a time. The SLM operated at a 10 kHz modulation frequency.

Figure 13:
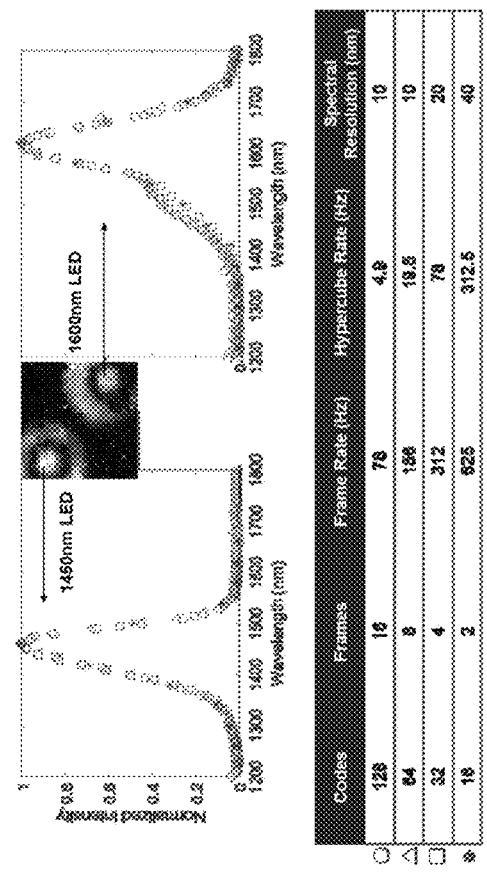
FIG. 13 shows experimental spectra and images of LEDs with center wavelengths of 1450 nm and 1600 nm and a table showing the relationship between number of codes, number of frames, frame rate, hypercube rate, and spectral resolution for a time-encoded, spectrally multiplexed imaging system.

FIG. 13 shows the capability of flexible encoding and the tradeoff between hypercube acquisition rate and spectral resolution in the system of FIG. 12A. In this experiment, each frame read out from the DFPA contained eight spectral channels. Since the SLM was operating at 10 kHz, the total integration time was N×100 μs, where N is the number of spectral channels or codes. The hypercube acquisition rate was the frame rate divided by the number of frames needed to acquire the full hypercube. For example, to acquire 128 spectral channels, sixteen frames were used where eight spectral channels are acquired per frame. Decreasing the number of spectral channels decoded increased the overall hypercube rate.

Figure 14:
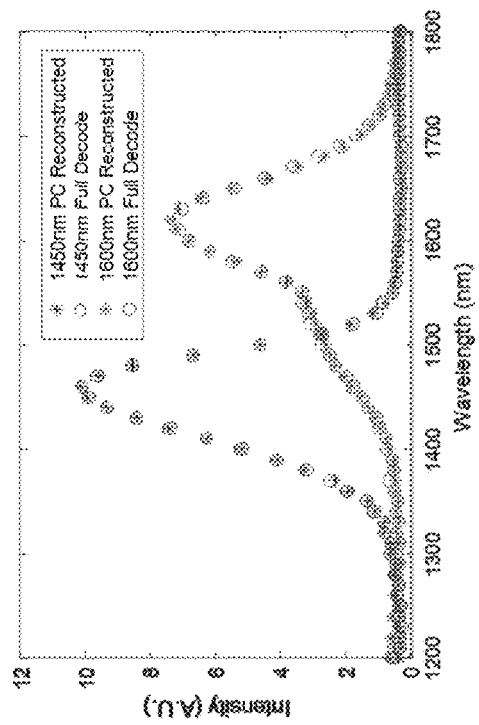
FIG. 14 is a plot of reconstructed and decoded spectra of LEDs with center wavelengths of 1450 nm and 1600 nm.

FIG. 14 shows an example of the flexible decoding enabled with a suitable DFPA. In this simulation, the DFPA decoded the top eight principal components. This data was read out in a single frame. The reconstructed spectrum shows good agreement with data acquired through fully decoding the spectrum (FIG. 13). By decoding the principal components, the hypercube acquisition rate can be increased to the frame rate. For example, 64 spectral channels can be acquired at 156 Hz instead of 19.5 Hz. Furthermore, this method can be used to implement spectral matched filtering.

Figure 15B:
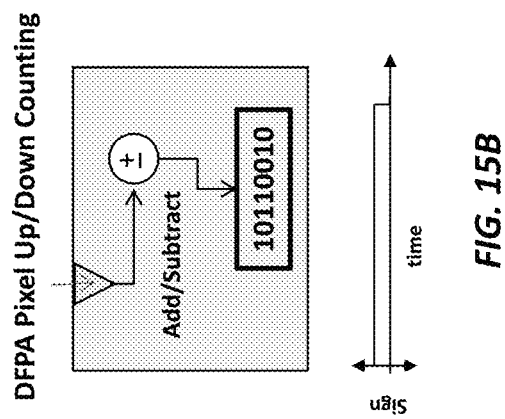
FIG. 15B shows a pixel with an up/down counter in a DFPA pixel used to sample the incident beams encoded with the temporal modulation of FIG. 15A.
Figure 15A:
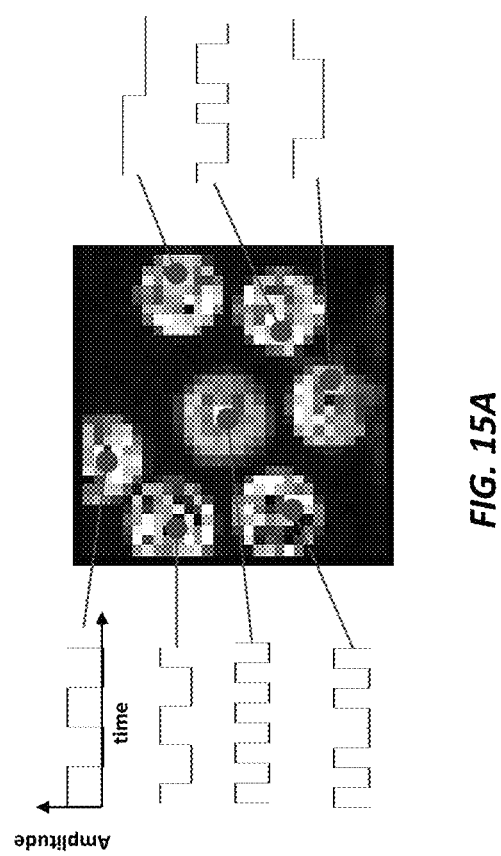
FIG. 15A is an experimentally acquired image of seven LEDs, each of which has a different center wavelength, showing different temporal modulation waveforms for each LED.

FIGS. 15A-15C illustrate flexible decoding for multiple LEDs, each of which emits light at a different central wavelength. The system (see, e.g., FIG. 12A) disperse and modulates the beam from each LED with a different binary modulation as shown in FIG. 15A. Each DFPA pixel includes an up/down counter, shown in FIG. 15B, that can be toggled to sample the recombined, modulated light field. When toggled appropriately, the up/down counter in a given pixel can be used to filter the incident light in a way that makes it possible same a subset of the LEDs at a given time.

FIG. 15C shows how the duty cycle of the modulation waveform at the DFPA can be varied. For example, in the LED experiment described above, the LED is pulsed on for 1 μs whereas the pixel modulation pulse is 200 ns. Controlling the width of the modulating pulse at the DFPA enables decoding of linear combinations of codes. For example, in FIG. 15C, the two LEDs at upper left are decoded in a single channel by adding the Hadamard codes. The first LED has a code of $\{+1,-1,+1,-1,+1,-1,+1,-1\}$ and the second LED has a code of $\{+1,+1,-1,-1,+1,+1,-1,-1\}$. When added together, this creates a new code $\{+2, 0, 0, -2, +2, 0, 0, -2\}$. This can be implemented at the DFPA by increasing the width of the pulse from 200 ns to 400 ns.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An imaging system comprising:
a first lens to image a first point in an object plane to a first point in a first focal plane and to image a second point in the object plane to a second point in the first plane;
a spatial light modulator (SLM), disposed in the first plane, to encode the first point in the first plane with a first temporal modulation and to encode the second point in the first plane with a second temporal modulation different from the first temporal modulation;
a second lens, in optical communication with the SLM, to image the first point in the first plane to a first point in a second plane and the second point in the first plane to a second point in the second plane; and
a detector array disposed in the second plane, the detector array comprising a first detector element positioned to sense both the first temporal modulation and the second temporal modulation,
wherein the SLM comprises N spatial modulation elements, the detector array comprises M detector elements, N is a positive integer, and M is a positive integer less than N.

2. The imaging system of claim 1, wherein the first temporal modulation and the second temporal modulation are based on a Hadamard matrix.

3. The imaging system of claim 1, further comprising:
a processor, operably coupled to the detector array, to recover information about the first point in the object plane and the second point in the object plane based on the first temporal modulation and the second temporal modulation.

4. The imaging system of claim 3, wherein the processor is configured to sample an output of the first detector element at a rate based on at least one of the first temporal modulation or the second temporal modulation.

5. The imaging system of claim 3, wherein the processor is configured to produce an image of the object plane based on the first temporal modulation and the second temporal modulation at a spatial resolution higher than a spatial resolution of the detector array.

6. The imaging system of claim 1, further comprising:
a first dispersive element, in optical communication with the first lens and the SLM, to disperse incident light into different spectral components, the first lens focusing the different spectral components from a first position in the object plane to different positions in the first plane.

7. The imaging system of claim 6, further comprising:
a second dispersive element, in optical communication with the SLM and the second lens, to recombine the different spectral components.

8. The imaging system of claim 1, further comprising:
a first polarizing element, in optical communication with the first lens and the SLM, to disperse incident light into different polarization components, the first lens focusing the different polarization components from a first position in the object plane to different positions in the first plane.

9. A method of imaging comprising:
imaging a first point in an object plane to a first point in a first plane;
imaging a second point in the object plane to a second point in the first plane;
encoding the first point in the first plane with a first temporal modulation;
encoding the second point in the first plane with a second temporal modulation different from the first temporal modulation;
imaging the first point in the first plane to a first point in a second plane;
imaging the second point in the first plane to a second point in the second plane; and
detecting, with a single detector element in an array of detector elements in the second plane, the first temporal modulation and the second temporal modulation simultaneously.

10. The method of claim 9, wherein the first temporal modulation and the second temporal modulation are based on a Hadamard matrix.

11. The method of claim 9, further comprising:
recovering information about the first point in the object plane and the second point in the object plane based on the first temporal modulation and the second temporal modulation.

12. The method of claim 11, wherein recovering information comprises sampling an output of the single detector element at a rate based on at least one of the first temporal modulation or the second temporal modulation.

13. The method of claim 11, wherein recovering information comprises producing a super-resolution image of the object plane based on the first temporal modulation and the second temporal modulation.

14. The method of claim 9, further comprising:
dispersing incident light into different spectral components, and
wherein imaging the first point in the object plane comprises focusing the different spectral components from a first position in the object plane to different positions in the first plane.

15. The method of claim 14, wherein imaging the first point in the first plane comprises recombining the different spectral components.

16. The method of claim 9, further comprising:
dispersing incident light into different polarization components, and
wherein imaging the first point in the object plane comprises focusing the different polarization components from a first position in the object plane to different positions in the first plane.

17. An imaging system comprising:
a spatial light modulator (SLM) to temporally encode different portions of a light field with respective temporal modulations, the respective temporal modulations based on a Hadamard matrix;
an optical element, in optical communication with the SLM, to spatially combine the different portions of the light field at a first plane;
a detector array, disposed in the first plane, to detect the light field at a spatial resolution lower than a spatial resolution of the SLM; and
a processor, operably coupled to the detector array, to sample an output of the detector array at a rate based on the respective temporal modulations.

18. The imaging system of claim 17, wherein the SLM is disposed in a first image plane and the second plane is a second image plane.

19. The imaging system of claim 17, further comprising:
a first dispersive element, in optical communication with the SLM, to form a first image of a first field of view on the SLM, the SLM modulating the first image with a first set of temporal modulations; and
a second dispersive element, in optical communication with the SLM, to form a second image of a second field of view on the SLM, the SLM modulating the second image with a second set of temporal modulations different from the first set of temporal modulations.

20. The imaging system of claim 19, wherein the detector array comprises a single detector element configured to detector one of the first set of temporal modulations different and one of the second set of temporal modulations.

21. The imaging system of claim 19, wherein the processor is configured to produce representations of the first image and the second image based on the first set of temporal modulations and the second set of temporal modulations.

22. An imaging system comprising:
a spatial light modulator (SLM) configured to apply temporal encoding sequences to multiple image features in parallel;
a focal plane array, in optical communication with the SLM, to sample the temporal encoding sequences during an integration period of the focal plane array; and
a processor, operably coupled to the focal plane array, to produce, based on the temporal encoding sequences, at least one of a super-resolution image, a hyperspectral image, a polarimetric image, a plenoptic image, or a spatially multiplexed image.

23. The imaging system of claim 1, wherein the first detector element is configured to decode both the first temporal modulation and the second temporal modulation.

24. The imaging system of claim 1, wherein the detector array has a readout rate lower than modulation rates of the first temporal modulation and the second temporal modulation.

* * * * *